United States Patent
Babin et al.

(10) Patent No.: US 6,710,593 B2
(45) Date of Patent: Mar. 23, 2004

(54) ROTARY POSITION SENSOR WITH A SELF-LUBRICATING BEARING

(75) Inventors: Brian George Babin, Goshen, IN (US); Todd Anthony Brown, Elkhart, IN (US)

(73) Assignee: American Electronic Components, Inc., Elkhart, IN (US)

(*) Notice: Subject to any disclaimer, the term of this patent is extended or adjusted under 35 U.S.C. 154(b) by 29 days.

(21) Appl. No.: 09/912,953

(22) Filed: Jul. 25, 2001

(65) Prior Publication Data

US 2003/0160606 A1 Aug. 28, 2003

(51) Int. Cl.⁷ ................................................. G01B 7/30
(52) U.S. Cl. .......................... 324/207.2; 324/207.25; 384/448; 384/276
(58) Field of Search ................... 324/207.2–207.25, 324/173, 174, 175, 166; 384/448, 276, 280, 295, 296, 909; 338/32 R, 32 H

(56) References Cited

U.S. PATENT DOCUMENTS

| | | | | |
|---|---|---|---|---|
| 3,782,794 A | * | 1/1974 | Chmura et al. | 384/492 |
| 4,053,190 A | * | 10/1977 | McCloskey | 384/192 |
| 4,575,145 A | * | 3/1986 | Wolfram et al. | 295/37 |
| 4,866,426 A | * | 9/1989 | Evans et al. | 340/541 |
| 5,056,938 A | * | 10/1991 | Ahlman et al. | 384/286 |
| 5,061,087 A | * | 10/1991 | Roerig et al. | 384/192 |
| 5,073,038 A | * | 12/1991 | O'Connell | 384/206 |
| 5,073,051 A | * | 12/1991 | Gugel et al. | 400/124.2 |
| 5,164,668 A | * | 11/1992 | Alfors | 324/207.2 |
| 5,219,231 A | * | 6/1993 | Sheedy | 384/206 |
| 5,265,965 A | * | 11/1993 | Harris et al. | 384/208 |
| 5,273,369 A | * | 12/1993 | Strobl | 384/206 |
| 5,444,369 A | * | 8/1995 | Luetzow | 324/207.2 |
| 5,462,381 A | * | 10/1995 | DeWachter et al. | 403/365 |
| 5,542,900 A | * | 8/1996 | Burke | 492/16 |
| 5,694,039 A | * | 12/1997 | Alfors | 324/207.2 |
| RE35,855 E | * | 7/1998 | Blaettner et al. | 384/204 |
| 5,789,917 A | * | 8/1998 | Oudet et al. | 324/207.2 |
| 5,791,787 A | * | 8/1998 | Nisley | 384/498 |
| 5,836,702 A | * | 11/1998 | Whiddon et al. | 384/584 |
| 5,885,006 A | * | 3/1999 | Sheedy | 384/192 |
| 5,993,065 A | * | 11/1999 | Ladzinski et al. | 384/49 |
| 6,130,535 A | * | 10/2000 | Herden et al. | 324/207.2 |
| 6,164,829 A | * | 12/2000 | Wenzel et al. | 384/203 |
| 6,194,894 B1 | * | 2/2001 | Apel et al. | 324/207.25 |
| 2002/0153879 A1 | * | 10/2002 | Muraji et al. | 324/207.2 |
| 2003/0020465 A1 | * | 1/2003 | Wolf | 324/207.2 |

* cited by examiner

*Primary Examiner*—Jay Patidar
(74) *Attorney, Agent, or Firm*—Katten Muchin Zavis Rosenman; John S. Paniaguas

(57) ABSTRACT

A rotary position sensor is formed with a self-lubricating bearing. The rotary position sensor includes a race which forms one bearing surface. A drive arm assembly forms a bearing element forming two mating bearing surfaces. For applications in which the bearing may be subjected to environmental conditions that could result in corrosion, one bearing surface may be formed from a corrosion resistant metal, such as stainless steel, while the mating bearing surface is homogeneously formed with the bearing element from a composite material which includes PFTE or Teflon. By homogeneously forming the bearing element from a composite material which includes Teflon, wear of the bearing element will not effect lubrication of the bearing.

8 Claims, 5 Drawing Sheets

ROTARY POSITION SENSOR WITH A SELF-LUBRICATING BEARING

BACKGROUND OF THE INVENTION

1. Technical Field of the Invention

The present invention relates to a self-lubricated bearing and more particularly to a self-lubricating radial bearing suitable for use in automotive underbody applications.

2. Description of the Prior Art

Various of types of bearings are known in the art, for example, radial bearings are known for coupling a rotating element to a stationery member to provide free and unrestricted rotation of the rotating element relative to the stationery member. In order to prevent undue wear, bearings are normally configured with provision for lubrication. As such, bearings normally include a cavity for holding a lubricating material. An example of such a bearing is disclosed in U.S. Pat. No. 5,836,702. Lubricated bearings are either provided with a fitting for replacing lubrication from an external source or provided in a sealed cavity. Sealed bearings are not suitable in many automotive applications due to the anticipated operation of the bearing over the warranty life of the bearing. In particular, lubricants and sealed bearings lose their lubrication properties over time. Thus, for applications where the number of bearing operations is expected to exceed the lubricant life, bearings are known which include provisions for external fittings to enable the lubricant within the bearings to be replaced. An example of such a bearing is disclosed in U.S. Pat. No. 5,791,787.

In other applications, bearings are used in relatively inaccessible locations. Such bearings are configured as self-lubricating bearings. Examples of such self-lubricating bearings are disclosed in U.S. Pat. Nos. 4,575,145; 5,219,231; 5,265,965; 5,273,369; 5,885,006 and 5,056,938. In general, self-lubricating bearings include mating bearing surfaces in which one bearing surface is formed from a metal and the other mating bearing surface is coated with Teflon also known as (polytetrafluorethylene or PFTE). Unfortunately, such Teflon coatings are subject to wear and as a consequence could result in loss of lubrication surface after extended wear, eventually leading to a catastrophic failure of the bearing. Thus, there is a need for a self-lubricated bearing for use in extended use applications.

SUMMARY OF THE INVENTION

Briefly, the present invention relates to a self-lubricating bearing and more particularly to a self-lubricated bearing which includes a race and a bearing element forming two mating bearing surfaces. For applications in which the bearing may be subjected to environmental conditions that could result in corrosion, one bearing surface may be formed from a corrosion resistant metal, such as stainless steel, while the mating bearing surface is homogeneously formed with the bearing element from a composite material which includes PFTE or Teflon. By homogeneously forming the bearing element from a composite material which includes Teflon, wear of the bearing element will not effect lubrication of the bearing.

DESCRIPTION OF THE DRAWINGS

These and other advantages of the present invention will be readily understood with reference to the following specification and attached drawing wherein.

DETAILED DESCRIPTION

Figure 22A:
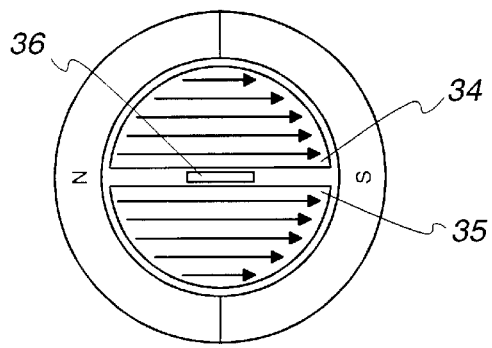
FIGS. 22A–22C illustrate the magnetic circuit for various positions of the magnet relative to the magnetic flux responsive element.
Figure 22B:
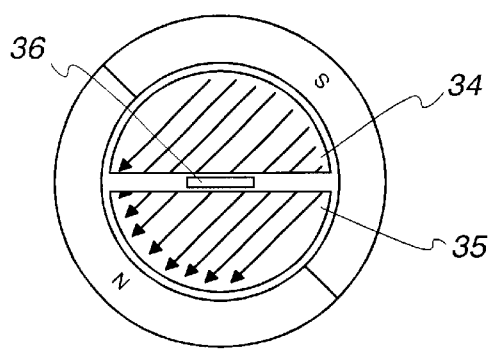
Figure 22C:
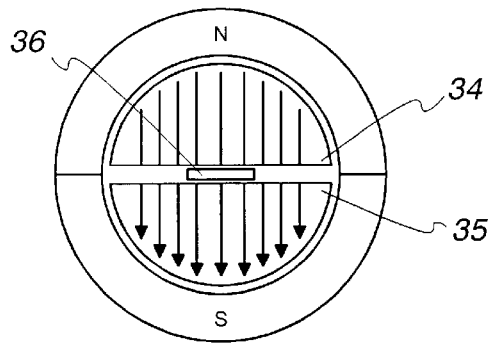
Figure 23:
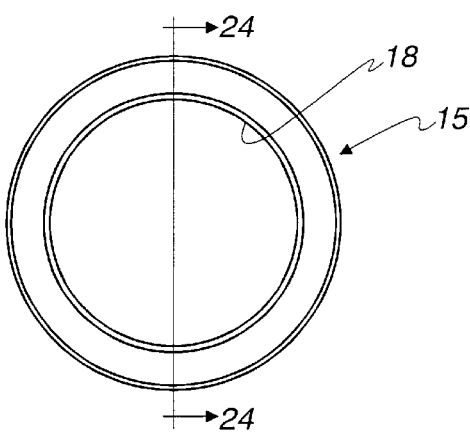
FIG. 23 is a plan view of a race which forms a portion of the self-lubricating bearing in accordance with the present invention.
Figure 24:
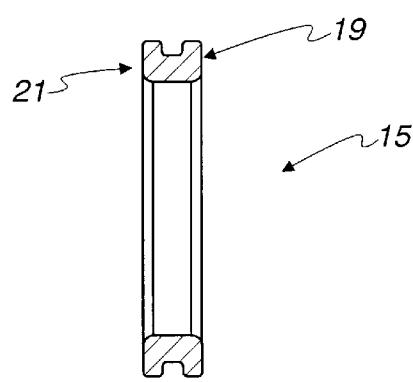
FIG. 24 is a sectional view along line 24—24 of FIG. 23.

The present invention relates to a self-lubricating bearing configured, for example, as a radial bearing, which includes a race and bearing element. The race is illustrated in FIGS. 23 and 24 while the bearing element is illustrated in FIGS. 17A–22. An important aspect of the invention is that the bearing surfaces on the race and the bearing element are configured to provide self-lubrication. Unlike self-lubricating bearings disclosed in the prior art, the race and the bearing element are formed from homogeneous materials. Accordingly, the lubrication effect provided at the bearing surfaces will not be diminished as the mating bearing surfaces wear.

Although the radial bearing in accordance with the present invention is described in terms of a rotary position sensor for use in an automobile underbody application, the principles of the present invention are applicable to virtually any type of bearing. FIGS. 23 and 24 illustrate the race while FIGS. 17A–22 illustrate the bearing element configured as a drive arm assembly for a rotary position sensor as generally illustrated in FIGS. 1–22.

The present invention relates to a self-lubricating bearing suitable for use in automotive underbody applications. The self-lubricated bearing in accordance with the present invention includes a race 15 (FIGS. 23 and 24) and a bearing element 24. As shown and as will be discussed in more detail below, the bearing element 24 includes an axial annular bearing surface 16 (FIG. 18) and a radial bearing surface 17. These bearing surfaces 16 and 17 are adapted to mate within an interior bearing surface 18 (FIG. 22) formed on the interior surface of the race 15. In particular, the annular axial bearing surface 16 (FIG. 18) on the bearing element or drive arm assembly 24 is adapted to mate with the inner surface 18 (FIG. 23) of the race 15. Similarly, the bearing surface 17 of the bearing element 24 in a radial plane is adapted to mate with one or the other of the radial surfaces 19, 21 (FIG. 23) of the race 15.

In general, the race 15 may be formed from metal. In applications where the bearing is subject to corrosive environments, such as in an automobile underbody environment, the race may be formed from a corrosion resistant metal such as ATSM 304 stainless steel with a fine finish.

The bearing element or drive arm 24 (FIG. 18) may be homogeneously formed from a polymer, such as composite plastic material that is blended with PFTE or Teflon. The plastic material may be a thermoset or thermoplastic material, such as glass-filled 6–12 nylon with, for example, 15% Teflon.

The bearing provides a metal-to-polymer bearing that is self-lubricating in which the Teflon migrates to the surface as the components wear for the life of the bearing. As such, unlike the self-lubricating bearings in the prior art, wear of the mating surfaces of the bearing components does not diminish the lubrication effect of the self-lubricating bearing.

Figure 6:
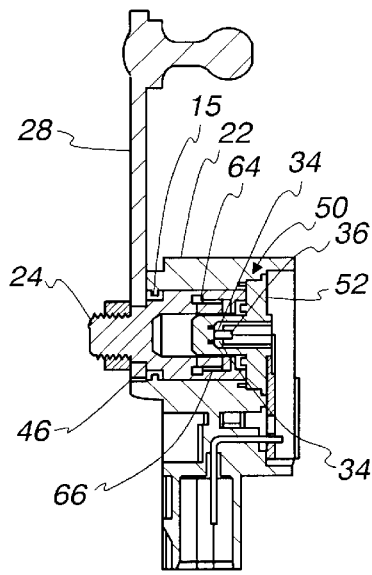
FIG. 6 is a sectional view along the line 6—6 of FIG. 5.
Figure 9:
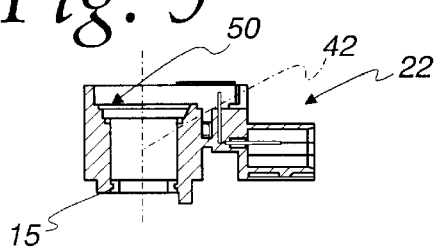
FIG. 9 is a sectional view along the line 9—9 of FIG. 7.

The following is an exemplary application of the self-lubricating radial bearing utilized in a rotary position sensor application for use in a automotive underbody application. In this application, the bearing race 15 is disposed within a molded housing 22 for providing bearing surfaces for a rotatable bearing element or drive arm 24 as best shown in FIGS. 6 and 9.

Turning to FIGS. 1–22, the rotary position sensor, generally identified with the reference numeral 20, includes a molded housing 22, a drive arm assembly 24 and a rotor plate 26.

A lever arm assembly 28, which does not form part of the present invention, may be attached to the drive arm assembly 24 by a suitable fastener 30. The lever arm 28 is adapted to be mechanically coupled to an external device whose rotational movement is to be sensed.

The rotor plate 26, shown best in FIGS. 13–16, is formed with a rotor cavity 32 for receiving a pair of flux concentrators 34, 35 (FIGS. 4 and 22A–22C) and a magnetic responsive element 36, such as a Hall effect IC and an optional flux shunt if required. The flux concentrators 34, 35 may be formed from a soft magnetic material with semicircular cross-section and disposed within the rotor cavity 32 along with the magnetic flux responsive element 36. The flux concentrators 34, 35 are disposed on opposing sides of the magnetic flux responsive element 36 and disposed within the rotor cavity 32 (FIGS. 22A–22C). As shown in FIGS. 4–16, a printed circuit board 38 may be used to provide an electrical connection between the magnetic flux responsive element 36 and a plurality of terminals 40 (FIG. 4) disposed within the main housing 22.

Figure 1:
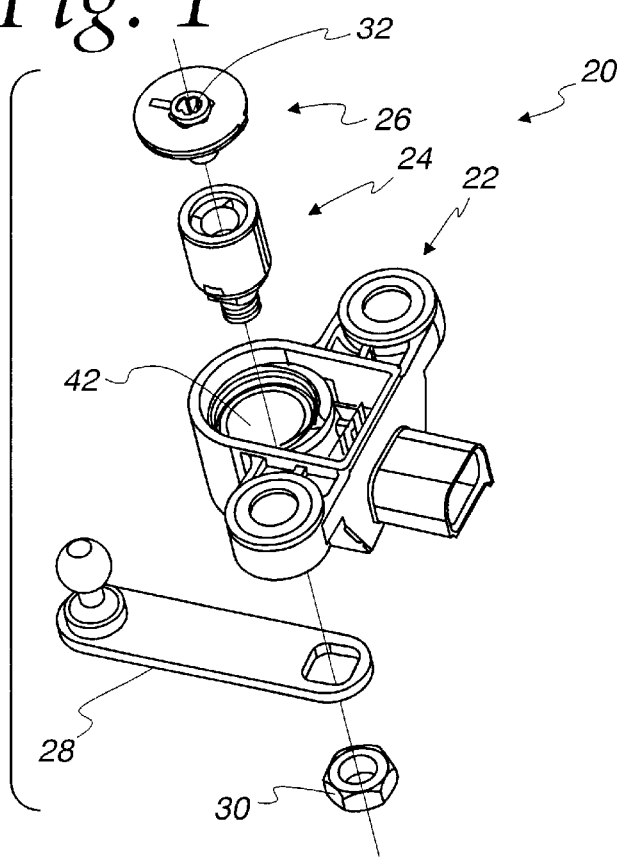
FIG. 1 is an exploded perspective view of a rotary position sensor formed with a housing in accordance with the present invention, shown without a printed circuit board, magnetic flux responsive element and flux concentrators.
Figure 2:
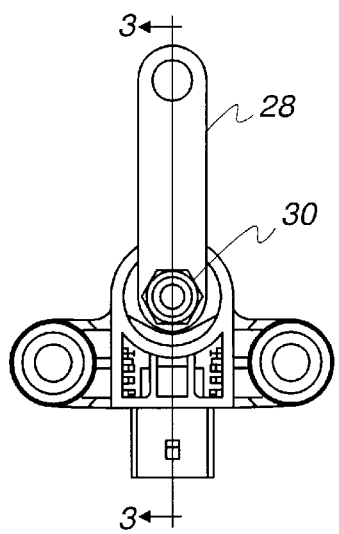
FIG. 2 is a top view of the rotary position sensor illustrated in FIG. 1.
Figure 3:
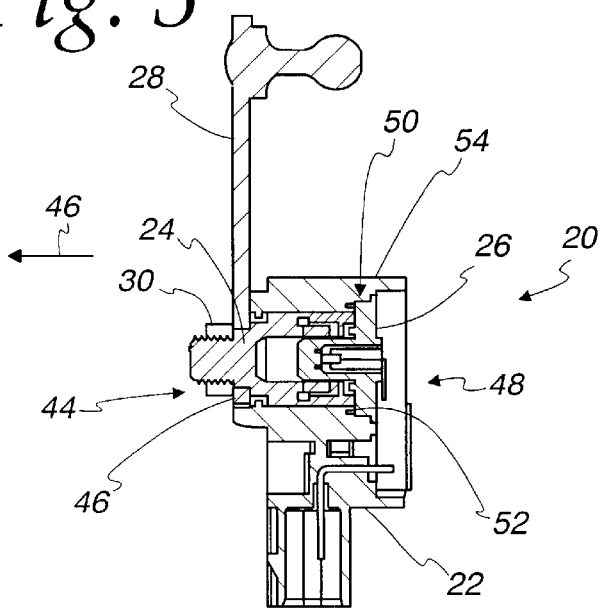
FIG. 3 is a sectional view along line 3—3 of the FIG. 2.
Figure 4:
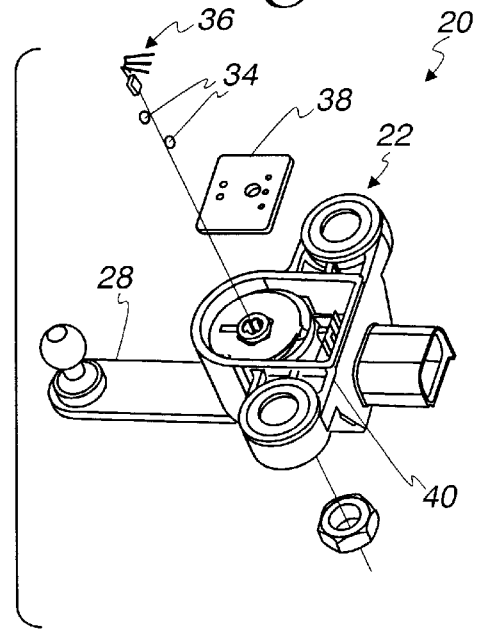
FIG. 4 is similar to FIG. 1 illustrating the rotary position sensor in accordance with the present invention partially assembled with the printed circuit board, magnetic flux responsive element and flux concentrators shown exploded.
Figure 5:
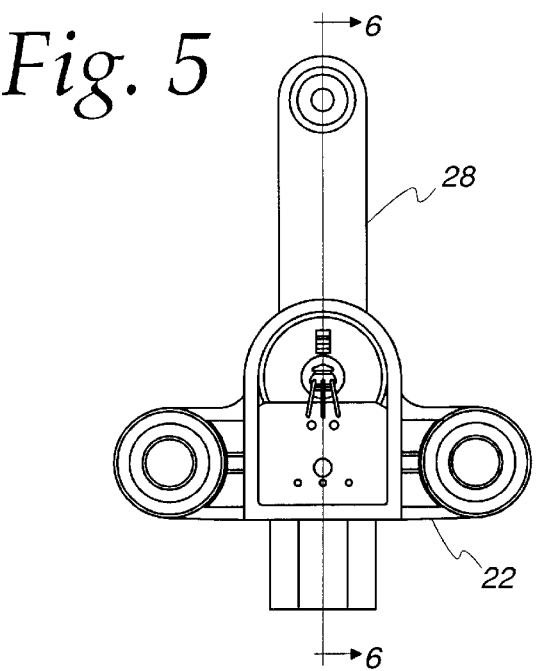
FIG. 5 is a bottom view of the rotary position sensor illustrated in FIG. 4.
Figure 7:
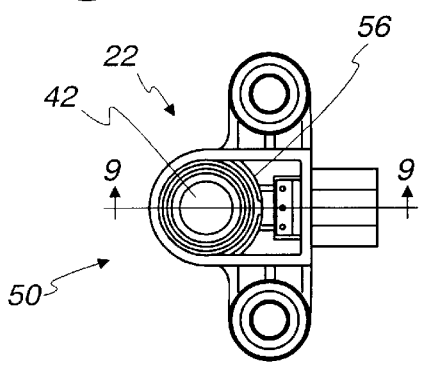
FIG. 7 is a bottom view of a molded housing which forms a part of the present invention.
Figure 8:
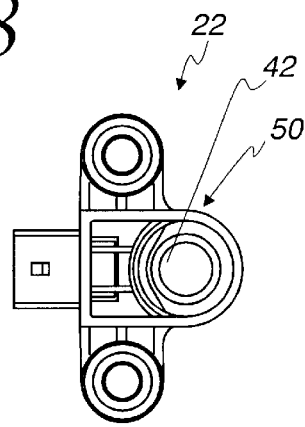
FIG. 8 is a top view of the molded housing illustrated in FIG. 7.

As best shown in FIGS. 1 and 7–10, the molded housing 22 is provided with a central aperture 42 (FIG. 7) for receiving the drive arm assembly 24. As shown in FIG. 3, one end 44 of the molded housing 22 is formed with a reduced diameter portion 46 which contacts an annular shoulder 49 (FIG. 20) on the drive arm assembly 24 to form a stop and limit axial movement of the drive arm assembly 24 in a direction of the arrow 47. The other end 48 of the molded housing 22 is formed with annular stepped surfaces, generally identified with the reference numeral 50 (FIGS. 7–9). The rotor plate 26 is formed with corresponding annular stepped surfaces 52 (FIGS. 3, 6, 13 and 14) that are adapted to mate with the stepped surfaces 50 formed in the molded housing 22 as best shown in FIGS. 3 and 6. The stepped surfaces 50 and 52 may be ultrasonically welded together.

Figure 10:
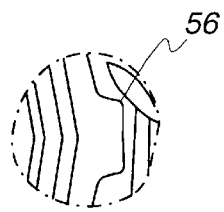
FIG. 10 is a detail of a portion of the housing illustrated in FIG. 7.
Figure 11A:
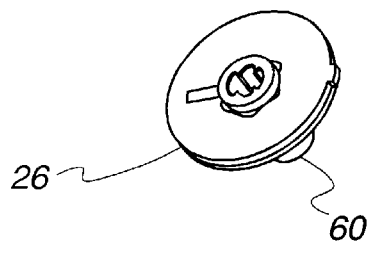
FIGS. 11A and 11B are perspective views of a rotor plate in accordance with the present invention.
Figure 11B:
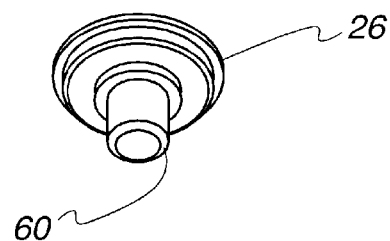
Figure 12:
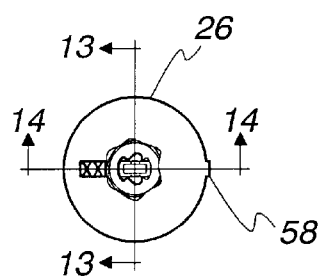
FIG. 12 is a top view of the rotor plate illustrated in FIGS. 11A and 11B.
Figure 15:
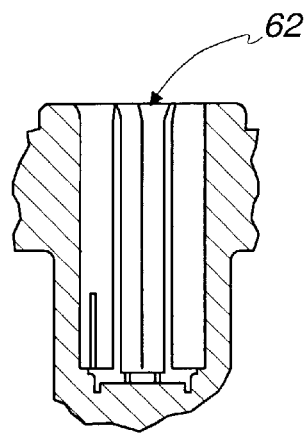
FIG. 15 is a detailed view of a portion of the rotor plate illustrated in FIG. 14.

The details of the molded housing 22 are illustrated in FIGS. 7–10. As shown in FIGS. 7 and 10, the aperture 42 is formed with a radial slot 56. The radial slot 56 is used to provide radial orientation of the rotor plate 26 relative to molded housing 22. In particular, the rotor plate 26 is provided with a radial tab 58 (FIG. 12). The radial tab 58 is adapted to be received in the radial slot 56 (FIG. 10) to provide radial registration of the rotor plate 26 relative to the molded housing 22.

Figure 13:
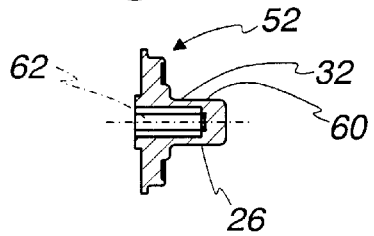
FIG. 13 is a sectional view along line 13—13 of FIG. 12.
Figure 16:
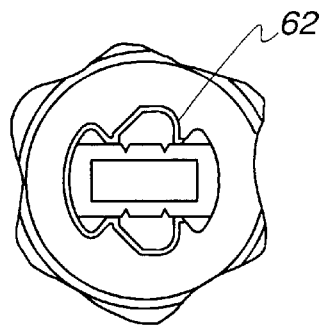
FIG. 16 is a detailed view of a portion of the rotor plate illustrated in FIG. 12.
Figure 14:
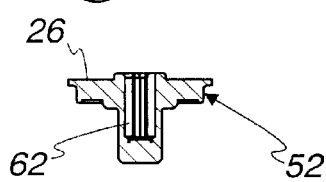
FIG. 14 is a sectional view along line 14—14 of FIG. 12.
Figure 17A:
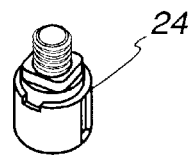
FIGS. 17A and 17B are perspective views of a drive arm assembly in accordance with the present invention.
Figure 17B:
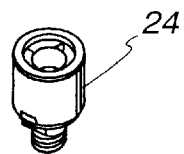
Figure 18:
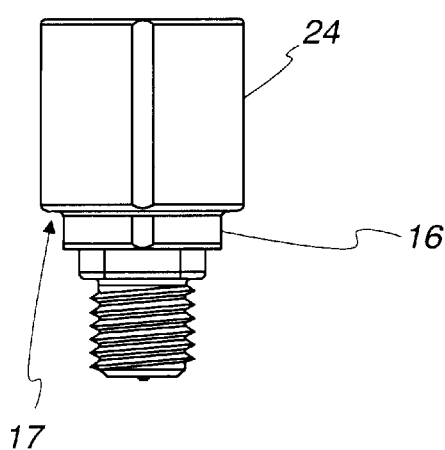
FIG. 18 is a side view of the drive arm assembly illustrated in FIGS. 17A and 17B.
Figure 19:
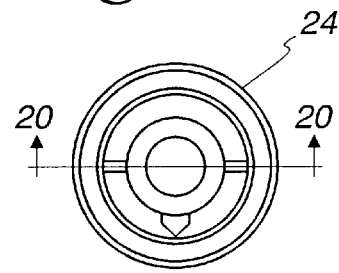
FIG. 19 is a bottom view of the drive arm assembly illustrated in FIG. 18.

As shown in FIG. 13, the rotor plate 26 is provided with an axially extending sleeve portion 60. The sleeve portion 60 is adapted to be received in a hollow cavity 62 (FIG. 20) formed in the drive arm assembly 24. As shown in FIGS. 12 and 14–16, the sleeve portion 60 of the rotor plate 26 is formed with a hollow cavity 62 (FIG. 13) for receiving one or more flux concentrators 34, 35 (FIG. 4) and a magnetic flux responsive element 36 and flux shunt, if required. As shown in FIGS. 3 and 6, such a configuration allows the drive arm assembly 24 to rotate relative to the cavity 62 and thus also rotate relative to the flux concentrators 34, 35 and the magnetic flux responsive element 36 (FIG. 4) and flux shunt, if used.

Figure 20:
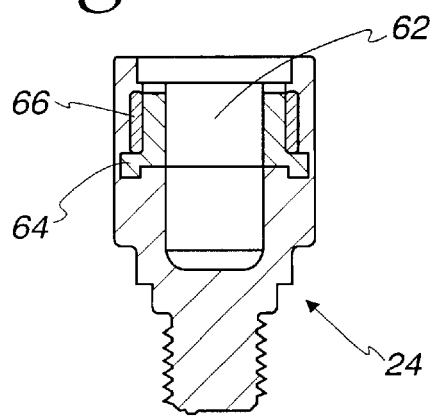
FIG. 20 is a sectional view along line 20—20 of FIG. 19.
Figure 21:
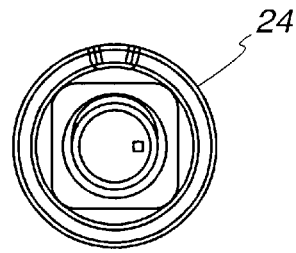
FIG. 21 is a top view of the drive arm assembly illustrated in FIG. 18.

As illustrated best in FIG. 20, the drive arm assembly 24 includes a generally circular magnet 64 and shunt ring 66. As shown, the shunt ring 66 circumscribes the circular magnet 64. When the rotor plate 26 and drive arm assembly 24 are assembled to the molded housing 22, as generally shown in FIGS. 3 and 6, the circular magnet 64 as well as the shunt ring 66 are axially aligned with a portion of the annular cavity formed in the axially extending portion 60 of the rotor plate 26 which results in the annular magnet 64 and shunt ring 66 being axially aligned with magnet 64 and shunt ring 66, as best shown in FIG. 6. Accordingly, rotation of the drive arm assembly 24 results in radial displacement of the circular magnet 64 relative to fixed position of the magnetic flux responsive element 36 and flux concentrators 34, as shown in FIGS. 22A–22C and generate a signal representative thereof.

The configuration of the magnet 64 illustrated in FIGS. 22A–22C is merely exemplary. In particular, the magnet 64 is shown as a diametrically charged magnet. The principles of the present invention are applicable to all magnet configurations including radially charged magnets (not shown).

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A rotary position sensor comprising:

a housing formed from a non-magnetic material having a central aperture;

a metallic race disposed in said central aperture forming a first bearing surface;

a drive arm assembly formed from a composite material which includes Teflon forming a second bearing surface configured to be in contact with said first bearing surface, said drive arm assembly including a generally circular magnet and a shunt ring, configured with a rotor cavity; and a magnetic flux responsive element and one or more flux concentrators adapted to be rigidly disposed within said rotor cavity and configured such that said magnet and shunt ring rotate with respect to said housing and said magnetic flux responsive element, said metal race and said second bearing surface on said drive arm assembly forming a self lubricating bearing.

2. The rotary position sensor as recited in claim 1, wherein said metallic race is formed from a corrosion resistant metal.

3. The rotary position sensor as recited in claim 2, wherein said corrosion resistant material is stainless steel.

4. The rotary position sensor as recited in claim 1, wherein said composite material is formed from a thermoset material blended with Teflon.

5. The rotary position sensor as recited in claim 1, wherein said composite material is formed from a thermoplastic material blended with Teflon.

6. The rotary position sensor as recited in claim 1, wherein said composite material is formed from a nylon material.

7. The rotary position sensor as recited in claim 6, wherein said nylon material is glass filled 6–12 nylon.

8. The rotary position sensor as recited in claim 7, wherein said composite material is blended with 15% Teflon.

* * * * *